United States Patent
Barber-Mingo et al.

(10) Patent No.: US 10,015,211 B2
(45) Date of Patent: Jul. 3, 2018

(54) EVENT TRIGGERED NOTIFICATIONS FOR COLLABORATIVE PROCESSES

(71) Applicant: International Business Machines Corporation, Armonk, NY (US)

(72) Inventors: Cynthia E. Barber-Mingo, Westford, MA (US); Arno Denne, Mulhuddart (IE); Liam S. Harpur, Mulhuddart (IE); John Kennedy, Mulhuddart (IE); Paula Prendergast, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/602,649

(22) Filed: May 23, 2017

(65) Prior Publication Data
US 2017/0257404 A1    Sep. 7, 2017

Related U.S. Application Data

(62) Division of application No. 14/826,273, filed on Aug. 14, 2015, which is a division of application No. 12/507,939, filed on Jul. 23, 2009, now abandoned.

(51) Int. Cl.
*H04L 29/06* (2006.01)
*G06Q 10/06* (2012.01)
(Continued)

(52) U.S. Cl.
CPC ......... *H04L 65/4015* (2013.01); *G06Q 10/06* (2013.01); *G06Q 10/10* (2013.01);
(Continued)

(58) Field of Classification Search
CPC ... H04L 65/4015; H04L 43/045; G06Q 10/10; G06Q 10/109; G06Q 10/06; G06Q 10/107
See application file for complete search history.

(56) References Cited

U.S. PATENT DOCUMENTS 3,631,470 A    12/1971    Bloom
5,204,897 A    4/1993    Wyman
(Continued)

FOREIGN PATENT DOCUMENTS

CN    1661610 A    8/2005
CN    101061485 A    10/2007
JP    2004000018 A    1/2004

OTHER PUBLICATIONS

Rich et al. "Adding a Collaborative Agent to Graphical User Interface", 1996, ACM, pp. 21-30.
(Continued)

*Primary Examiner* — Michael C Lai
(74) *Attorney, Agent, or Firm* — Stevens & Showalter, LLP

(57) ABSTRACT

Notifying a user of a collaborative process that an event of interest has occurred, includes providing a graphical user interface that graphically interacts with a user to identify electronically generated collaborative content of a corresponding computer-executed collaborative process that is to be tracked, wherein the user defines an originator of the generated collaborative content; designating at least one event that triggers a notification to the originator of the collaborative content; communicating with a collaborative process server computer to identify at least one event associated with the collaborative process to monitor; receiving an indication that at least one designated event has occurred; and modifying a visual display of the shared collaborative content when a designated event associated with the shared collaborative content is detected.

8 Claims, 8 Drawing Sheets

(51) Int. Cl.
*G06Q 10/10* (2012.01)
*H04L 12/26* (2006.01)

(52) U.S. Cl.
CPC ......... *G06Q 10/107* (2013.01); *G06Q 10/109* (2013.01); *H04L 43/045* (2013.01)

(56) References Cited

U.S. PATENT DOCUMENTS

| | | | |
|---|---|---|---|
| 5,208,748 | A | 5/1993 | Flores et al. |
| 5,220,604 | A | 6/1993 | Gasser et al. |
| 5,224,163 | A | 6/1993 | Gasser et al. |
| 5,245,532 | A | 9/1993 | Mourier |
| 5,249,291 | A | 9/1993 | Williams |
| 5,260,999 | A | 11/1993 | Wyman |
| 5,315,657 | A | 5/1994 | Abadi et al. |
| 5,438,508 | A | 8/1995 | Wyman |
| 5,737,606 | A | 4/1998 | Cummins |
| 5,958,050 | A | 9/1999 | Griffin et al. |
| 6,101,557 | A | 8/2000 | Movall et al. |
| 6,185,728 | B1 | 2/2001 | Hejlsberg |
| 6,189,103 | B1 | 2/2001 | Nevarez et al. |
| 6,212,549 | B1 * | 4/2001 | Page ..................... G06Q 10/06 709/204 |
| 6,220,510 | B1 | 4/2001 | Everett et al. |
| 6,230,266 | B1 | 5/2001 | Perlman et al. |
| 6,247,026 | B1 | 6/2001 | Waldo et al. |
| 6,260,069 | B1 | 7/2001 | Anglin |
| 6,343,377 | B1 | 1/2002 | Gessner et al. |
| 6,367,009 | B1 | 4/2002 | Davis et al. |
| 6,449,617 | B1 | 9/2002 | Quinn et al. |
| 6,523,012 | B1 | 2/2003 | Glassman et al. |
| 6,549,950 | B2 * | 4/2003 | Lytle ..................... G06Q 10/107 709/202 |
| 6,581,068 | B1 | 6/2003 | Bensoussan et al. |
| 6,601,171 | B1 | 7/2003 | Carter et al. |
| 6,711,679 | B1 | 3/2004 | Guski et al. |
| 6,792,462 | B2 | 9/2004 | Bernhardt et al. |
| 6,854,007 | B1 * | 2/2005 | Hammond ........... G06Q 10/107 709/206 |
| 6,879,690 | B2 | 4/2005 | Faccin et al. |
| 6,885,388 | B2 | 4/2005 | Gunter et al. |
| 7,062,490 | B2 | 6/2006 | Adya et al. |
| 7,716,593 | B2 * | 5/2010 | Durazo ................. G06Q 10/107 709/206 |
| 2002/0035608 | A1 * | 3/2002 | Milovanovic .......... G06Q 10/10 709/206 |
| 2003/0233421 | A1 * | 12/2003 | Shibata ................. G06Q 10/107 709/206 |
| 2005/0004990 | A1 | 1/2005 | Durazo et al. |
| 2005/0160145 | A1 | 7/2005 | Gruen et al. |
| 2006/0246436 | A1 | 11/2006 | Ohno et al. |
| 2007/0143169 | A1 * | 6/2007 | Grant ..................... G06Q 10/06 705/7.14 |
| 2008/0313536 | A1 * | 12/2008 | Larsen ................... G06Q 10/06 715/273 |
| 2011/0022662 | A1 | 1/2011 | Barber-Mingo et al. |

OTHER PUBLICATIONS

Lutz, Andreas; International Search Report and Written Opinion of the International Searching Authority; International Application No. PCT/EP2010/060584; dated Jan. 11, 2011; European Patent Office.
Office Action; Chinese patent application No. 201080031766.6; dated Apr. 30, 2014; State Intellectual Property Office of the People's Republic of China.
Office Action; Taiwanese Application No. TW20100118947; dated Mar. 12, 2014; Taiwan Intellectual Property Office; Taipei, Taiwan.
Second Office Action; Chinese Patent Application No. 201080031766.6; dated Dec. 12, 2014; State Intellectual Property Office of the People's Republic of China.
Lai, Michael C.; Non-final Office Action; U.S. Appl. No. 12/507,939; dated Jan. 17; 2012; United States Patent and Trademark Office; Alexandria, VA.
Lai, Michael C.; Final Office Action; U.S. Appl. No. 12/507,939; dated May 9, 2012; United States Patent and Trademark Office; Alexandria, VA.
Lai, Michael C.; Advisory Action; U.S. Appl. No. 12/507,939; dated Aug. 22, 2012; United States Patent and Trademark Office; Alexandria, VA.
Macdonald, Allen R. et al.; Decision on Appeal; Patent Trial and Appeal Board; U.S. Patent Appeal No. 2013-005302; U.S. Appl. No. 12/507,939; dated Jun. 17, 2015; United States Patent and Trademark Office; Alexandria, VA.
Lai, Michael C.; Office Action; U.S. Appl. No. 14/826,273; dated Sep. 23, 2016; United States Patent and Trademark Office; Alexandria, VA.
Lai, Michael C.; Notice of Allowance; U.S. Appl. No. 14/826,273; dated Feb. 27, 2017; United States Patent and Trademark Office; Alexandria, VA.
Lai, Michael C.; Notice of Allowance; U.S. Appl. No. 14/826,273; dated Jun. 22, 2017; United States Patent and Trademark Office; Alexandria, VA.

* cited by examiner

EVENT TRIGGERED NOTIFICATIONS FOR COLLABORATIVE PROCESSES

CROSS REFERENCE TO RELATED APPLICATIONS

This application is a divisional of U.S. patent application Ser. No. 14/826,273, entitled EVENT TRIGGERED NOTIFICATIONS FOR COLLABORATIVE PROCESSES, filed Aug. 14, 2015, which is a divisional of U.S. patent application Ser. No. 12/507,939, entitled EVENT TRIGGERED NOTIFICATIONS FOR COLLABORATIVE PROCESSES, filed Jul. 23, 2009, the entire disclosures of which are incorporated by reference herein.

BACKGROUND

The present invention relates to enhancements of electronic collaborative processes, and in particular, to the propagation of notifications that serve as "hints" related to activity associated with a corresponding collaborative process.

Electronic mail (email) systems, electronic calendars and electronic to-do lists are quite popular among computer users, both in business settings and for personal use. However, in email systems, a message originator has relatively little visibility as to how a message recipient handles a received message, including when a particular message is opened or viewed, how messages are prioritized, whether messages that require some type of follow-up action are addressed, and so forth. Similarly, it is typically expected that some sort of activity may be required by the recipient of a shared electronic calendar event and/or shared to-do task. Again however, an event or task originator has relatively little visibility as to when the shared event or task is opened or viewed by the recipient. Still further, the originator has little visibility as to whether the recipient has implemented some type of follow-up action, etc.

For messages, events and/or tasks that request that the recipient perform some type of action, the originator and/or recipient must manually take action to track the message, event or task status. For example, the originator may be required to send a follow-up message to the recipient to check on the status of the specific request.

BRIEF SUMMARY

According to aspects of the present invention, a collaborative process is tracked and a notification of an occurrence of an event is propagated to an originator. A computer program product includes a non-transitory computer readable storage medium having computer readable program code embodied therewith. In particular, the computer readable program code includes computer readable program code configured to implement a graphical user interface that, when executed on a processing device, graphically interacts with a user to identify electronically generated collaborative content of a corresponding computer-executed collaborative process that is to be tracked, wherein the user defines an originator of the generated collaborative content; computer readable program code configured to implement a portion of the graphical user interface that graphically interacts with the originator of the collaborative content to designate at least one event that triggers a notification to the originator of the collaborative content; and computer readable program code configured to implement a portion of the graphical user interface that communicates with a collaborative process server computer coupled to a network environment to identify the collaborative process to be tracked and at least one event associated with the collaborative process to monitor. The computer readable program code also includes computer readable program code configured to share the collaborative content with at least one recipient; computer readable program code configured to receive by the graphical user interface, an indication from the collaborative process server computer that at least one designated event has occurred other than a communication from any recipient back to the originator; and computer readable program code configured to transform the graphical user interface to modify a visual display of the shared collaborative content when a designated event associated with the shared collaborative content is detected so as to visually depict a notification of the occurrence of the at least one designated event to the originator.

According to further aspects of the present invention, computer-implemented method to notify a user of an occurrence of an event includes providing, by the computer, a graphical user interface that graphically interacts with a user to identify electronically generated collaborative content of a corresponding computer-executed collaborative process that is to be tracked, wherein the user defines an originator of the generated collaborative content; implementing, by the computer, a portion of the graphical user interface that graphically interacts with the originator of the collaborative content to designate at least one event that triggers a notification to the originator of the collaborative content; and implementing, by the computer, a portion of the graphical user interface that communicates with a collaborative process server computer coupled to a network environment to identify the collaborative process to be tracked and at least one event associated with the collaborative process to monitor. The method also includes sharing, by the computer, the collaborative content with at least one recipient; receiving, by the graphical user interface, an indication from the collaborative process server computer that at least one designated event has occurred other than a communication from any recipient back to the originator; and transforming, by the computer, the graphical user interface to modify a visual display of the shared collaborative content when a designated event associated with the shared collaborative content is detected so as to visually depict a notification of the occurrence of the at least one designated event to the originator.

DETAILED DESCRIPTION

Figure 1:
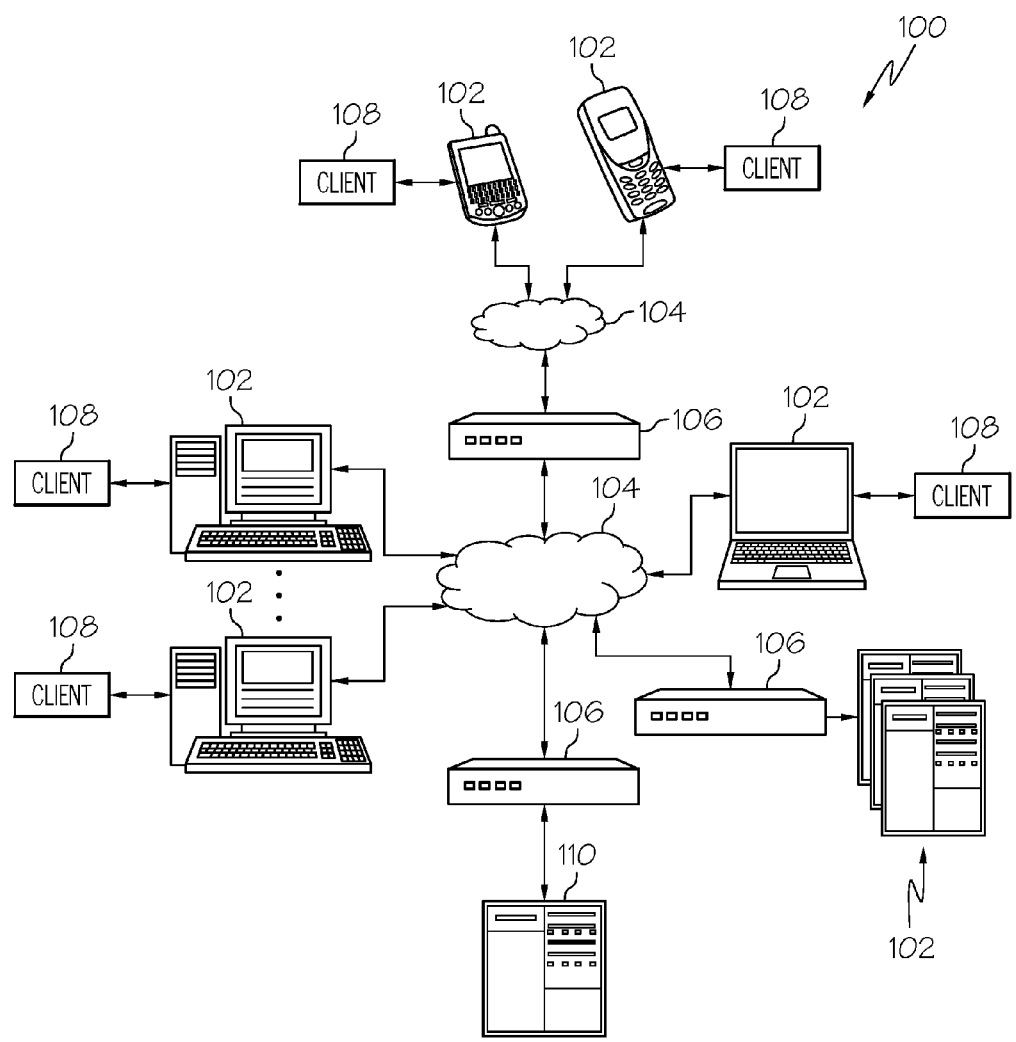
FIG. 1 is a schematic illustration of an exemplary system in which computer-implemented event triggered notifications can be electronically generated and/or delivered, where the notifications correspond to hints of activity associated with a corresponding collaborative process.

According to various aspects of the present invention, methods, computer program products and systems are provided for the propagation of notifications, also referred to herein as "hints", which are triggered by detecting the occurrence of one or more events associated with a shared collaborative process. The propagated hints alert an originator of the shared collaborative process as to the occurrence of the associated triggering event(s) in a manner that may not reveal the specific details of the associated triggering event(s). That is, the hints are propagated to inform the originator that a triggering event has occurred, e.g., an assigned task is being worked on, a follow-up meeting has been scheduled, etc., without requiring the originator of the shared collaborative process to micro-manage the details of those events or to otherwise proactively monitor the status of the corresponding shared collaborative process.

Moreover, the generation of hints may be automated or semi-automated in a manner that eliminates, substantially eliminates, simplifies or otherwise reduces the interaction required by the shared collaborative process recipient in order for the originator to receive the hint. The ability to automatically track triggering events thus allows automated "overview level" management in a manner that does not require the originator to expend significant resources on follow-ups for situations where a recipient is taking steps to implement an action associated with the shared collaborative process.

Each hint received by the originator identifies the occurrence of one or more events of interest that are associated with a corresponding collaborative process. In this regard, events may be positive actions, e.g., activity carried out by a recipient, such as forwarding a communication associated with the corresponding collaborative process. An event may also comprise a negative action or omission of an anticipated action, such as a failure of a recipient to take an action within a prescribed period of time. Regardless, each hint contains sufficient information to allow the corresponding originator to at least identify that the associated event has occurred.

According to aspects of the invention, the originator of a collaborative process may interact with a graphical user interface to configure the manner in which the hints are, or are not, conveyed. As a few illustrative examples, the collaborative process originator may select an option within the graphical user interface to receive notifications that are propagated upon certain triggering events, e.g., actions performed by one or more of the recipients. In this regard, the graphical user interface may be implemented as a notification utility within corresponding collaborative process application or as an application that can be executed independent of, or in conjunction with the associated collaborative process application. Regardless, the interface may be configured to allow the originator to select which types of triggering events will result in the propagation of a notification, and/or what type of display transformation the originator would like to see to serve as visual indicia of the notification, examples of which shall be described in greater detail herein.

Referring now to the drawings and particularly to FIG. 1, a general diagram of a computer system 100 is illustrated. The computer system 100 comprises a plurality of hardware processing devices, designated generally by the reference 102 that are linked together by a network 104. Typical processing devices 102 may include servers, personal computers, notebook computers, transactional systems, purpose-driven appliances, pervasive computing devices such as a personal data assistant (PDA), cellular access processing devices, special purpose computing devices, printing and imaging devices, facsimile devices, storage devices and/or other devices capable of communicating over the network 104. The processing devices 102 may execute software, including, for example, applications and/or other code that process information stored in various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world-wide web, and/or other arrangements for enabling communication between the processing devices 102, in either real time or otherwise, e.g., via time shifting, batch processing, etc. The system 100 is shown by way of illustration, and not by way of limitation, as a computing environment in which various aspects of the present invention may be practiced.

As illustrated, various processing devices 102 may participate in a collaborative environment, which may include one or more shared collaborative process applications, e.g., electronic mail (email) systems capable of creating, sending, receiving, storing or otherwise manipulating messages, electronic calendar systems capable of creating, storing and otherwise manipulating events by order of time and/or date, and to-do systems capable of creating, storing and otherwise manipulating events associated with tasks that are to be completed at some time in the future, i.e., "to-do" tasks. For example, various processing devices 102 may each execute a communications client 108 that facilitates one or more collaborative processes, e.g., email, calendaring, to-do tasks, etc., such as via communication across the network 104 with a corresponding collaborative process server 110.

In practice, various collaborative processes may be integrated into the same client 108, or multiple clients 108 may be required for different collaborative processes. For example, the client 108 may comprise, or interact with a software application that integrates email, calendaring and/or to-do lists. Alternatively, a processing device 102 may include a first client 108 for email, and a second client 108 for a non-email collaborative application, e.g., calendaring, to-do list, etc.

Still further, the client 108 may comprise a generic software application, e.g., a Web browser. In this regard, the user may utilize the Web browser to log into an Internet based email/calendaring/to-do application hosted by the collaborative process server 110, etc. Still further, a client 108 may be utilized to implement a graphical user interface to setup, manage and/or monitor notifications, e.g., where such capabilities are not provided within the corresponding shared collaborative process application.

Although collaborative process systems provide a number of conveniences, the courtesies typically used in collaborative process systems does not always align with the demands of busy individuals. To illustrate, assume that a shared collaborative process originator initiates a shared collaborative process by sending an email message to a recipient to request that the recipient perform a task. The originator may have no idea whether the recipient received and read the message or understood its content. Moreover, the message originator may have no idea whether the recipient performed a task requested within the message, unless the recipient replies to the sender with a status update or message confirmation. In the event that the originator is anxious to know the status of the requested task, the originator may also become impatient and send a follow up message to the recipient. This impatience, although perhaps understandable, is an inefficient utilization of resources.

Keeping with the above-example, under certain circumstances, the originator may wish to know that the requested action has been completed. Under different circumstances, the originator may be content just knowing that the recipient is working on the requested action. For example, assume that the originator sends an email message to a recipient that requests the recipient to perform an action that will involve others to complete. In this case, a notification may be sent to the originator when a recipient forwards the email message to a third party. The originator is likely to be unconcerned with the details of the forwarded message. Rather, the originator may be content to simply know that the email message has been forwarded on.

Figure 2:
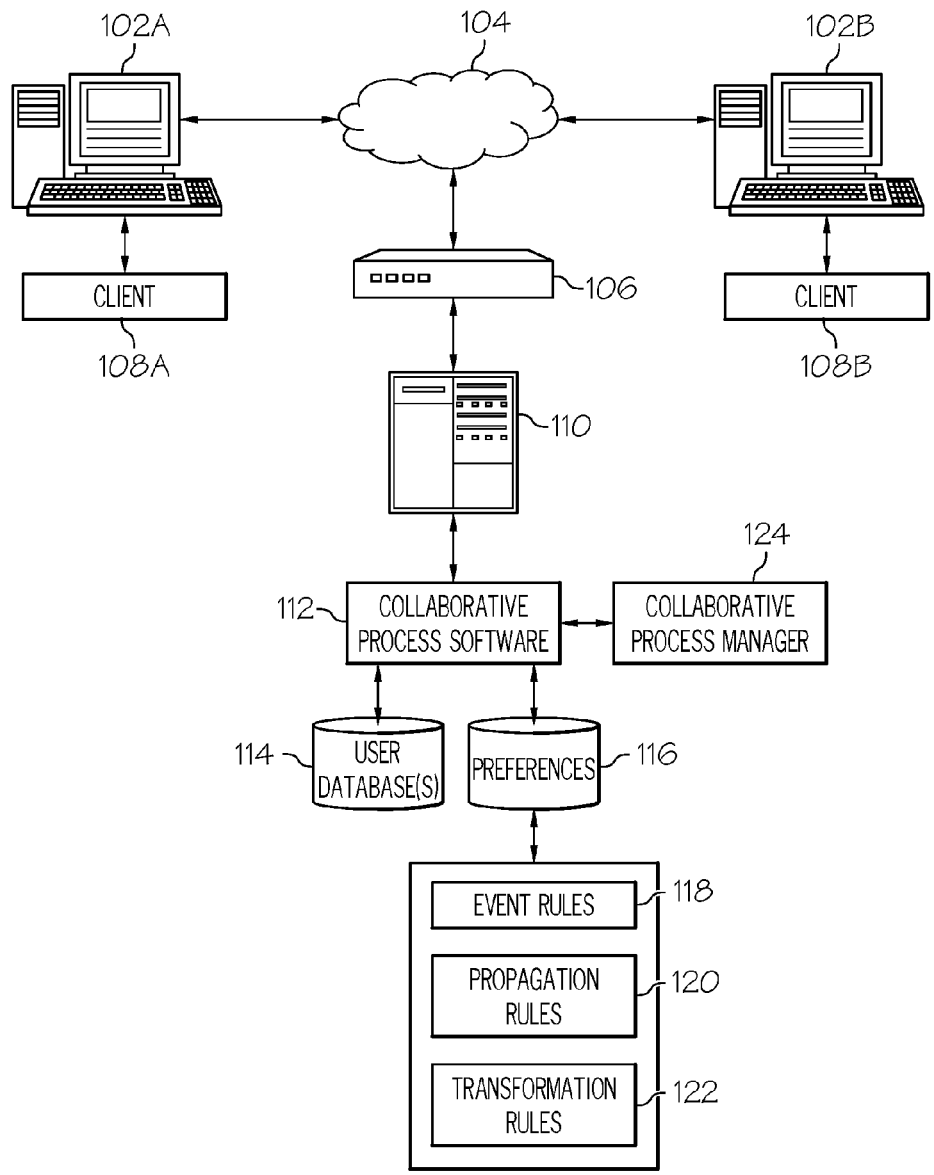
FIG. 2 is a block diagram of a system to facilitate computer-implemented event triggered propagation of notifications associated with corresponding tracked collaborative processes, according to various aspects of the present invention.

Referring to FIG. 2, according to aspects of the present invention, a user, e.g., a shared collaborative process originator, on a first processing device, designated 102A may communicate, e.g., using a collaborative process, e.g., email message, calendar event, to-do task, via its collaborative process client 108A with a correspondent, i.e., a recipient, on a second processing device, designated 102B via the corresponding collaborative process client 108B across a network 104. For example, the collaborative process clients 108A, 108B may comprise dedicated collaborative process applications or they may execute within a web browser or other application on the corresponding processing clients 108A, 108B respectively.

In this regard, collaborative process software 112 may be executed on the collaborative process server 110, which interacts with a user database 114 and a preferences database 116. The user database 114 identifies users that may participate in the collaborative process applications supported by the collaborative process server 110. The user database 114 may also store each user's subscribing peers as well as other user information pertinent to the particular implementation of the collaborative process system. For example, the user database 114 may provide information needed to share collaborative content associated with a collaborative process with other users.

The preferences database 116 may be used to enhance user interaction with the collaborative process as will be described in greater detail herein. The preferences stored in the preference database 116 may be characterized in any practical manner. For example, the preferences may be expressed as rules that define how the collaborative process system responds to predetermined events. Moreover, evaluation of rules in the affirmative and/or in the negative may be used to indicate the occurrence of a triggering event. Additionally, rules may comprise simple or complex structures. Still further, a decision with regard to whether or not a triggering event occurred may be determined based upon either complete or incomplete information. For example, a rule may require that each of a number of predicates must be satisfied before determining that a triggering event occurred. Failure of one of the predicates may thus yield a determination that a triggering event has not occurred.

The preferences may be organized to include event rules 118 that define one or more triggering events, which, upon the occurrence thereof, may initiate the propagation of a notification, as will be described in detail herein. The preferences may also be organized to include propagation rules 120, which define conditions for propagating notifications. The propagation rules 120 may first require the occurrence of a predetermined triggering event, e.g., defined by a corresponding event rule 118 before being evaluated, as will be described in greater detail herein. The preferences may also be organized to include transformation rules 122, which define rules associated with how a propagated notification, i.e., generated if one or more conditions of the propagation rules are met, is displayed to the originator, as will be described in greater detail herein.

The collaborative process software 112 may be implemented in any appropriate manner to implement the features and functions set out more fully herein. For purposes of illustration, and not by way of limitation, the collaborative process software 112 is illustrated as having a collaborative process manager 124 for managing aspects of the collaborative process system in a conventional manner, such as by maintaining user lists, e.g., in the user database 114, facilitating, logging or otherwise enabling collaborative process communications, etc.

Figure 3:
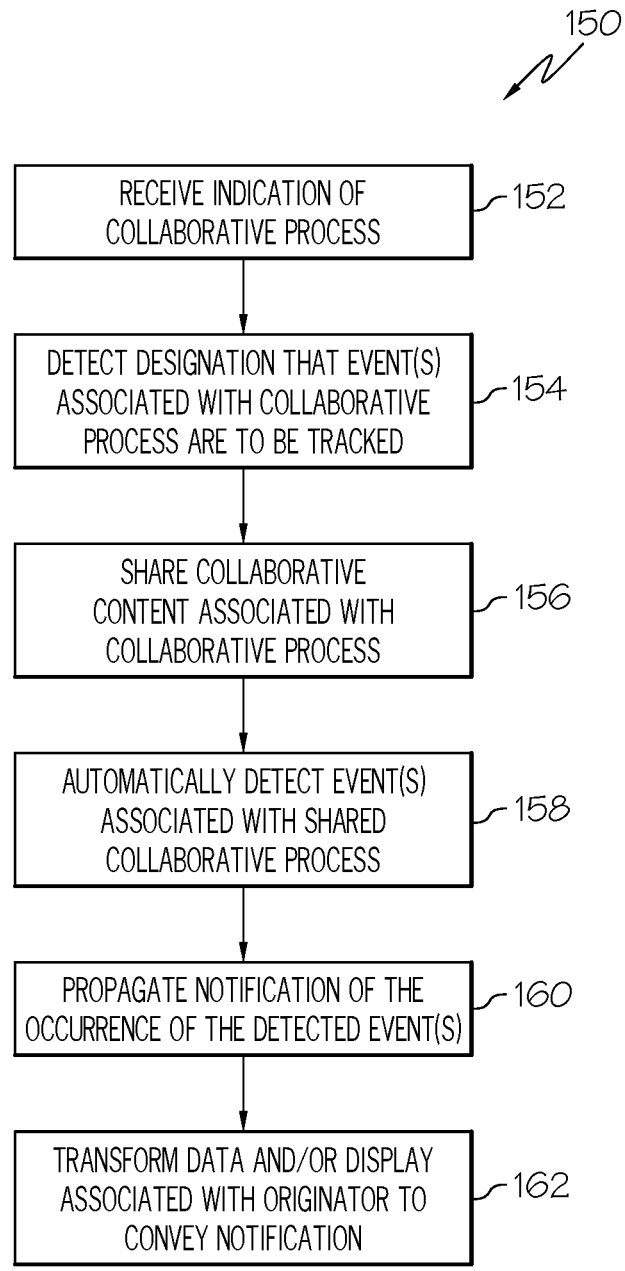
FIG. 3 is a flow chart of a computer-implemented method for electronically propagating notifications that are triggered by events associated with corresponding tracked collaborative processes, according to various aspects of the present invention.

Referring now to FIG. 3, a method 150 of tracking a collaborative process is illustrated according to various aspects of the present invention. The method 150 may be implemented, for example, as a computer program product comprising a computer readable storage medium having computer readable program code embodied therewith, the computer readable program code comprising computer readable program code configured to implement the steps set out herein with regard to FIG. 3.

An indication is received at 152, that a collaborative process has been initiated. For example, the method at 152 may comprise receiving, at a collaborative process server computer coupled to a network environment, e.g., collaborative process server 110, an indication that a user has initiated a computer implemented collaborative process that generates shared collaborative content, wherein the user defines an originator of the generated collaborative content.

As a few exemplary illustrations, the collaborative process may comprise, scheduling a shared calendar event, creating an electronic message (email message), initializing a shared to-do task, or other such collaborative process. The initialization may also require some other action, e.g., by designating that the collaborative content is to be tracked so that hints are generated. The originator may also be required to set up preferences, e.g., as described with reference to FIG. 2. In this regard, the originator may initiate the collaborative process on a processing device, such as the first processing device 102A.

Further, the method 150 detects a designation that events associated with collaborative process are to be tracked at 154. For example, the step at 154 may comprise obtaining, by the collaborative process server computer, a designation that events associated with the initiated collaborative process are to be tracked, where information associated with the collaborative process is stored in a computer storage device accessible by the collaborative process server computer, and the collaborative process server computer is utilized to share the collaborative content associated with the collaborative process with at least one recipient.

By way of illustration, as shown in FIG. 2, the collaborative process server 110 executes collaborative process software 112 that interacts with the user database 114 and preferences database 116, which may be used to distinguish whether the initiated collaborative process is to be tracked, and if so, distinguish events that will trigger propagation of a hint. For example, the originator may optionally designate one or more events associated with the collaborative process to be tracked. This may be done, for example, by selecting an appropriate option associated with the collaborative process in a corresponding graphical user interface. The originator may thus interact with the client 108, which communicates with the collaborative process software 112 to implement one or more event rules 118, one or more propagation rules 120, and/or one or more transformation rules 122, which event rules 118, propagation rules 120, and/or transformation rules 122 are described in greater detail herein.

The collaborative content associated with collaborative process is shared with one or more recipients at 156. For example, the collaborative process server computer may be utilized to share the collaborative content associated with the collaborative process with at least one recipient, e.g., as chosen by the originator. Thus, for instance, the collaborative process server 110 may use the network 104 to share the collaborative content with one or more clients 108.

Events associated with shared collaborative content are automatically detected at 158. For example, the method at step 158 may comprise obtaining, by the collaborative process server computer, information identifying the occurrence of computer implemented events associated with the shared collaborative content, where the events are triggered, for example, by activity associated with at least one recipient. By way of illustration and not by way of limitation, the collaborative process server computer itself may detect the occurrence of computer implemented events, e.g., by polling, monitoring or otherwise accessing event information. As another illustrative example, the collaborative process server may obtain information identifying the occurrence of computer implemented events, e.g., by receiving an indication that an event has occurred, e.g., from an event notification system.

As noted in greater detail herein, events may comprise activity, other than a communication from any of the recipients back to the originator, performed by at least one of the recipients associated with the shared collaborative content, failure to act by one or more recipients within a prescribed time, etc. Also, as noted in greater detail herein, the types of events that are detected may be specified by the originator using the event rules 118. The types of detected events may also be specified on a case by case basis. For example, the types of events may be different or the same for the various recipients of the shared collaborative content. Accordingly, the originator may select a first set of event rules 118 for a first recipient, and a second set of event rules 118 for a second recipient, which are the same as, or different from the first set of event rules. The originator may also set different rules across different collaborative process domains. For example, the originator may want to receive hints under a first set of conditions if the triggering activity is email-related, and the originator may want to receive hints under different circumstances if the triggering event is a scheduling of a calendaring event, completion of a to-do task item, etc.

Upon the detection of a specified triggering event, e.g., initiated by at least one of the recipients associated with the shared collaborative content, a notification of the occurrence of the event is propagated to the originator at 160. The notification to the originator of the occurrence may not reveal the content or details associated with the event. For example, the step at 160 may comprise propagating a notification of the occurrence of the events to the originator, where the notification of the occurrence may not reveal the content associated with the event(s). As such, a screen display of a corresponding computer processing device, which is associated with the originator, is transformed to provide a visual indication of the notification that represents specific information, e.g., makes the originator aware of the happening of the triggering event. In this regard, as noted in greater detail herein, conditions associated with the notification, including for example, notification delivery format, notification delivery address, etc., may be specified by the originator using the propagation rules 120.

Still further, in certain applications, the collaborative process server may utilize operational efficiencies associated with the issuance of notification(s). For example, the process server may annotate, abbreviate, aggregate, or otherwise consolidate one or more events and/or one or more notifications into a single notification message. Moreover, the collaborative process server may delay, batch process or otherwise control the delivery of the notification, e.g., depending upon the mechanisms utilized to detect corresponding events.

Moreover, processing, such as may be executed by the collaborative process server, may automatically transform the computer stored information associated with the collaborative process if events associated with the shared collaborative content are detected, e.g., to update a database or other information to designate the occurrence of a triggering event.

A display and/or data on a computer processing device associated with the originator are transformed at 162. For example, the method at 162 may comprise automatically transforming the computer stored information associated with the collaborative process if one or more events associated with the shared collaborative content are detected by propagating a notification of the occurrence of the event(s) to the originator, where the notification of the occurrence may not reveal the content and/or detail associated with the detected event(s). Thus, a screen display of a computer processing device associated with the originator is transformed to provide a visual indication of the notification. In this regard, the transformation of the screen display represents a transformation of the data that represents tangible object(s), i.e., an action or actions carried out in response to a collaborative process, wherein the notification is generated in response to the detected event and is based upon the transformed computer stored information associated with the collaborative process. The type of information automatically transformed may vary depending upon the particular implementation of the collaborative process. For example, the transformation may comprise updating data that is representative of the collaborative process to designate that an event has occurred.

Figure 3A:
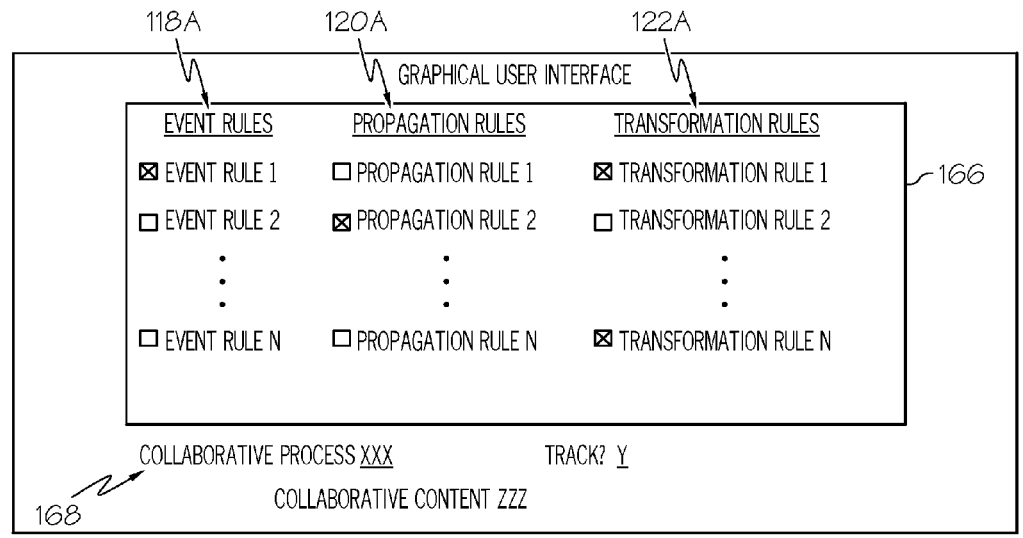
FIG. 3A is an illustration of a graphical user interface including exemplary sets of rules to be applied to a collaborative process according to various aspects of the present invention.

Referring to FIG. 3A, by way of illustration and not limitation, the originator may select one or more event rules 118A, one or more propagation rules 120A, and one or more transformation rules 122A for implementation with a tracked collaborative process, e.g., by checking select boxes or making some other designation in a graphical user interface 166. The graphical user interface 166 may be a component of a corresponding collaborative process application, or the graphical user interface 166 may interact with or otherwise operate in conjunction with corresponding collaborative process application, e.g., by interacting with the collaborative process application on the user's processing device and/or by interacting with the collaborative process server 110.

According to various aspects of the present invention, a computer program product is provided to notify a user of a collaborative process that an event of interest has occurred. The computer program product comprises a computer readable storage medium having computer readable program code embodied therewith.

In this regard, the computer readable program code comprises computer readable program code configured to implement a graphical user interface that, when executed on a processing device, graphically interacts with a user to identify electronically generated collaborative content of a corresponding computer-executed collaborative process that is to be tracked. For example, the graphical user interface 166 schematically illustrated in FIG. 3A represents that a collaborative process 168 is selected to be tracked. Under this configuration, the user of the graphical user interface 166 defines an originator of the generated collaborative content associated with the collaborative process 168. The graphical user interface 167 graphically interacts with the originator of the collaborative content to designate at least one event that triggers a notification to the originator of the collaborative content, e.g., by setting, selecting, accepting, or otherwise defining or allowing the event or events that will trigger a notification, e.g., via 118A.

The graphical user interface 166 communicates with a collaborative process server computer coupled to a network environment to identify the collaborative process to be tracked and at least one event associated with the collaborative process to monitor. For example, as illustrated in FIGS. 1 and 2, a processing device 102 may execute a client 108 which may comprise the graphical user interface 166, which can communicate over network 104 to the collaborative process server 110. In response thereto, the collaborative content is shared with at least one recipient.

The computer program product further comprises computer readable program code configured to receive by the graphical user interface, an indication from the collaborative process server computer that at least one designated event has occurred, and computer readable program code configured to cause the graphical user interface to transform a visual display of the shared collaborative content if a designated event associated with the shared collaborative content is detected so as to visually depict the notification of the occurrence of the event to the originator, where the notification of the occurrence may not reveal the details associated with the event.

The transformation provides a visual indication of the propagated notification to the originator, to alert the originator of the occurrence of the detected event. Conditions associated with the transformation may be specified by the originator using the transformation rules 122, as discussed in greater detail herein. By way of illustration and not limitation, referring to FIG. 3B, a notification box 164 that is visually observable on a graphical user interface 166 associated with collaborative process 168 may be used to designate a notification that one or more events associated with the shared collaborative content have been detected.

Figure 3B:
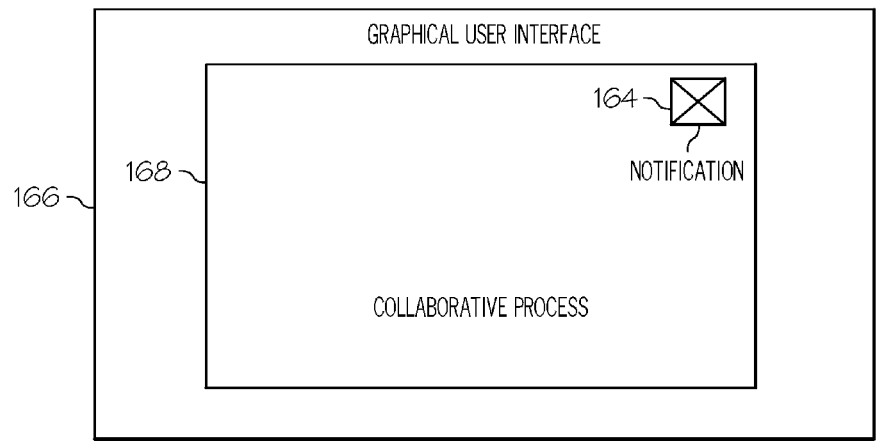
FIG. 3B is an illustration of a graphical user interface including an exemplary transformation according to various aspects of the present invention.

In this regard, FIGS. 3A and 3B are presented in simplified schematic fashion by way of illustration and not by way of limitation and are not intended to limit the claimed invention to any particular layout or arrangement of indicia within the graphical user interface. Moreover, the notification may be visually represented by any visual metaphor, including for example, modification to text, graphics, color, font properties, etc.

By way of illustration, and not by way of limitation, a project leader within a company may send an email to team members to initiate a collaborative process with regard to a project that must be completed. The project leader may thus define the originator of the collaborative process. The project leader does not need to micromanage the specific details of the work performed by the project team members. However, the project manager may like to know if team members are working towards the project. According to various aspects of the invention, triggering events may be defined that trigger a notification to the originator when corresponding triggering events have taken place. For example, the project manager may receive a notification, i.e., hint, that a project team member forwarded a request to a vendor related to the project, etc.

In this regard, the notification to the originator need not carry the details of the vendor request because knowledge that the communication took place may be all that is necessary to the project manager. That is, the project manager may be less interested in the details of the communication, and more interesting in knowing of the occurrence of the email. As yet another example, the project manager may be interested to know that a predetermined period of time has lapsed and the project team member has failed to take a timely action.

In this regard, as yet another illustrative example, the project manager may only desire that notifications are propagated upon the instance of certain triggering events taken by one or more of the recipients, but not other events and/or recipients. By way of illustration, a notification may be propagated to the originator if the shared collaborative content associated with the collaborative process that is being tracked is forwarded by at least one of the recipients to a new participant. However, the project manager may not be interested in receiving notifications if the team members are emailing back and forth only to themselves.

Additionally, the project leader may wish to receive a notification, i.e., hint, that a project team member has set up a meeting with a vender, e.g., via the use of a shared electronic calendar, or created a to-do task for the vender that is related to the collaborative process, e.g., via the use of an electronic to-do task system, etc. Once again, the notification to the originator need not carry the details of the vendor request, because knowledge that the event, e.g., the creation of the meeting on the electronic calendar or the creation of a to-do task on the electronic to-do task system, took place is all that is necessary to the project manager. Accordingly, hints may be propagated across multiple collaborative process systems. That is, the originator may have initiated the collaborative process via an email message. The process-initiating email may trigger a recipient to schedule an activity on a calendaring system, thus generating the propagation of a hint back to the originator. As yet a further example, receipt of the process-initiating email may trigger a recipient to set up a collaborative to-do task, thus triggering the propagation of a hint back to the originator.

According to further aspects of the present invention, notification of the triggering events can take any number of forms. The type of display transformation selected by the originator may be, for example, a modification of a representation of the shared collaborative content, such as an "icon" in an associated software application. Thus, for example, an originator of collaborative content may be notified of activity associated with the collaborative process by modifying a selected color applied against the sent email in the originator's corresponding folder, e.g., "sent items" folder of the originator's email application. Still further, the notification may take other forms such as the delivery of an email message, text message, instant message, etc.

According to still further aspects of the invention, upon receipt of the shared collaborative content associated with the collaborative process that is to be tracked, one or more recipients may be notified of the tracking of the collaborative content. Further, one or more recipients may have the option to override the propagation of notifications, in which case notifications are not propagated for the originator upon the performance of subsequent triggering events by that recipient. A notice that one or more of the recipients has overridden the propagation of notifications may be propagated to the originator to alert the originator of the override.

Figure 4:
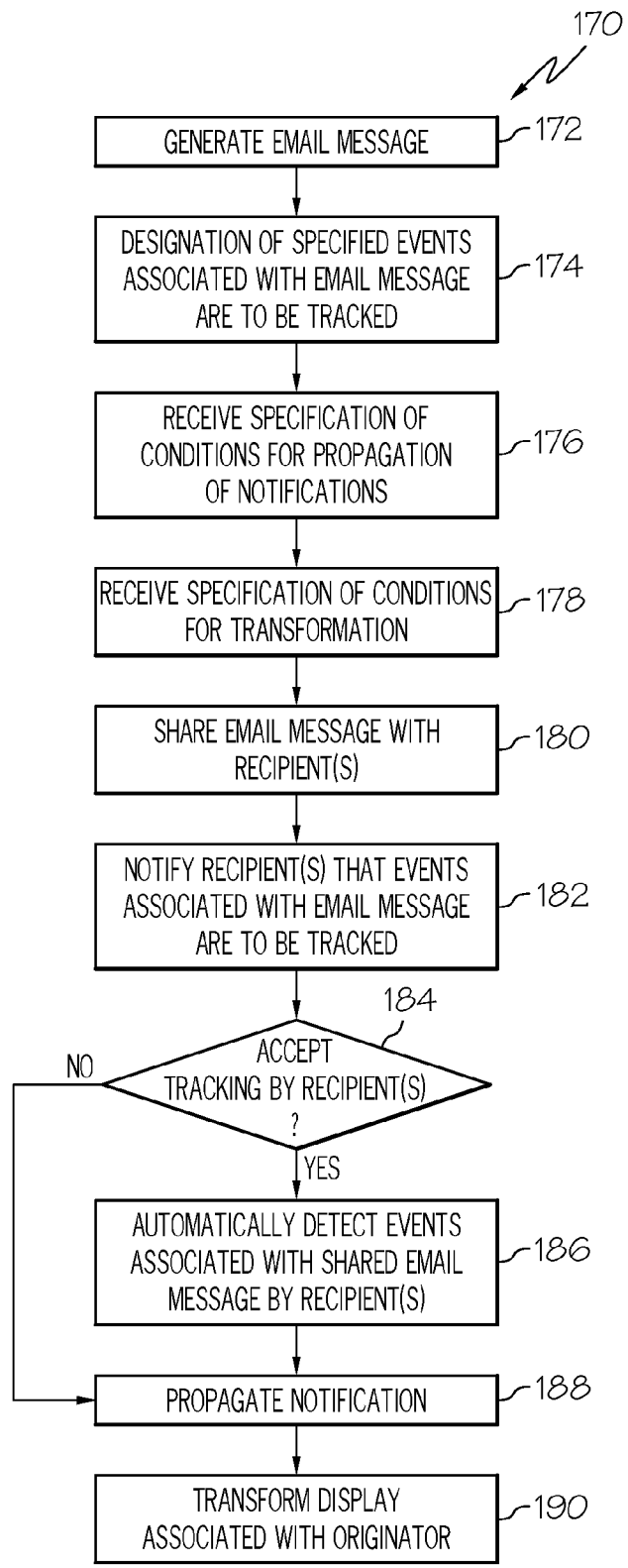
FIG. 4 is a flow chart of a computer-implemented method for electronically propagating notifications that are triggered by events associated with a tracked email message according to various aspects of the present invention.

Referring now to FIG. 4, a flow chart 170 illustrating exemplary steps for carrying out an aspect of the invention is shown. In this example, a collaborative process is initiated by generating an email message authored by an originator at 172. The email message is initiated to generate collaborative content associated with the email message. The collaborative content may include, for example, a request for one or more recipients to perform one or more tasks.

The originator designates that specified triggering events associated with the email message are to be tracked, and those designations are received, e.g., by a collaborative process server at 174. The triggering events may be specified by the originator by selecting one or more event rules 118 to be implemented using a graphical user interface to the collaborative process software 112, e.g., as described more fully herein.

By way of illustration and not limitation, the triggering events may comprise one or more of deleting the email message that includes the shared collaborative content, overriding the tracking of events associated with the shared collaborative content, or sharing, forwarding, etc. the email message that includes the shared collaborative content. The triggering event may also include other manipulations of the email message, such as copying the content into another software application, such as a word processor, spreadsheet, etc. Sharing an email message containing the shared collaborative content may comprise, for example, forwarding the email message that includes the shared collaborative content to one or more new recipients, forwarding the email message to one or more members identified in the distribution list, e.g., carbon copy (cc), blind carbon copy (bcc), etc.

The originator may use the collaborative process software 112 to specify which types of events are to be detected, and may also specify which of the recipients to track the events thereof. For example, the originator may wish to receive notifications that one or more of the recipients forwarded the email message that includes the shared collaborative content to a sub-recipient, but may not wish to receive notification if one or more of the recipients' forwards the email message to a group of other recipients.

The originator may use the collaborative process software 112 to specify conditions associated with the propagation of notifications, which are received, e.g., by the collaborative process server at 176, e.g., as described in greater detail herein. By way of illustration and not limitation, the originator may use the propagation rules 120 to specify a constraint to the number of hints received over a given period of time when events associated with the tracked collaborative process are detected. Further, the originator may specify, using the propagation rules 120, that the originator will receive notifications only within a certain time period, e.g., only receive notifications for up to one month after sending the email message, or only receive notifications within certain windows of time, e.g., once one week has elapsed after sending the email message, only during business hours, etc.

The propagation rules may also be utilized to set up routing of hints. For example, the rules may specify that hints are to be delivered to the originator's computer during business hours, but after business hours, a text message should be sent to the originator's cellular telephone. The various propagation rules 120 selected by the originator may be the same or different for each selected recipient.

The originator may use the collaborative process software 112 to specify conditions associated with the transformation associated with the propagated notifications, and such specifications are received at 178, e.g., at the collaborative process server, e.g., as described more fully herein. By way of illustration and not limitation, the originator may specify, using the transformation rules 122, that a visual display of a computer processing device is transformed upon the propagation of each notification. The originator may specify that the transformation of the display takes the form of, for example, a modification of data on the display of the originator's computer processing device, e.g., an icon associated with the email software application, e.g., a sent email message icon in the originator's sent items folder or a color change of the sent email message in the originator's sent items folder, or a new message that appears on the originator's computer processing device's display, etc. Still further, the hint may take different forms depending upon the detected triggering action. For example, if a recipient forwards the email, the hint, e.g., a displayed as an icon, may take a first color, visual appearance, location on the display, etc. Correspondingly, an action, such as deleting the email may take a different form, color, location, visual representation, etc. As another example, forwarding the email only to recipients within the original distribution list(s) may take on a first set of display parameters, whereas forwarding the email to a recipient on an exclude list or otherwise outside the originally listed recipients may trigger the display of the hint using a different set of display parameters.

A server computer is used to share the collaborative content associated with the created email message with the one or more recipients specified by the originator at 180. The same server computer or a different server computer may be used for subsequent sharing of the email message that includes the shared collaborative content, e.g., by one or more of the recipients.

Upon receipt of the email message that includes the shared collaborative content, the recipients may be given notice that events associated with the email message are to be tracked at 182. The notice may be, for example, in the form of text in a pop-up message when the email message is opened, an icon associated with the email message, or a specific color of the email message, e.g., in an inbox associated with the one or more recipients.

If a notification is given, then the recipients may be given the option to override or accept the tracking of events associated with the shared collaborative content at 184. Overriding the tracking of the events may comprise, for example, selecting an appropriate box contained in a pop-up message window on the display device of the recipient's computer processing device. Accepting the tracking may comprise, for example, doing nothing, clearing a notification box, positively acquiescing, etc.

If one or more of the recipients accept the tracking of events at 184, triggering events, other than a communication back to the originator, e.g., a reply to the originator or a confirmation of a "read-receipt", performed by the accepting recipients associated with the shared collaborative content are automatically detected at 186. The triggering events are detected according to the event rules 118 that have been specified by the originator for that particular accepting recipient. That is, a triggering event is automatically detected if the conditions associated with a corresponding event rule 118, which has been specified by the originator for that particular recipient, are met.

Upon the detection of a triggering event corresponding to an event rule 118 by one of the accepting recipients, a notification of the occurrence of the event is propagated to the originator at 188. Details in connection with the propagation of the occurrence of the event are specified by the originator at 176, as discussed above. However, each recipient may be provided with an option to enable sending notifications or disable sending notifications. If one or more recipients indicates the option to disable sending notifications, propagating notifications in connections with events in connection with those recipients are refrained from.

As noted above, the notification to the originator of the occurrence may not reveal the content associated with the event. Also, a notification that any of the recipients has overridden the tracking of events, i.e., at 184, may also be a triggering event by the overriding recipients that propagates a notification at 188.

A display on a computer processing device associated with the originator is transformed at 190. The transformation provides a visual indication of the notification to the originator, to alert the originator of the occurrence of the event. Details in connection with the transformation are specified by the originator at 178, as discussed above.

Figure 5:
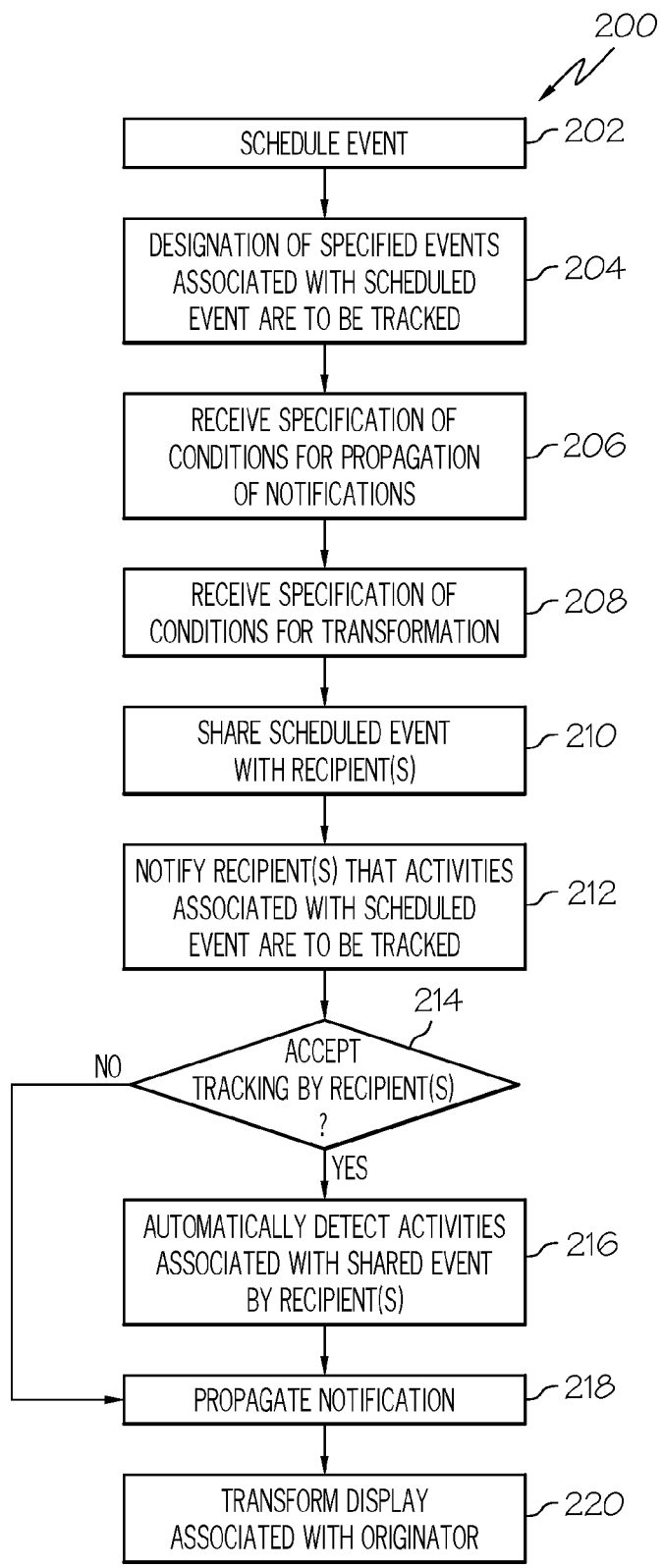
FIG. 5 is a flow chart of a computer-implemented method for electronically propagating notifications that are triggered by events associated with a tracked electronic calendar event according to various aspects of the present invention.

Referring now to FIG. 5, a flow chart 200 illustrating exemplary steps for carrying out another aspect of the invention is shown. In this example, a collaborative process is initiated by scheduling an event on a shared electronic calendar by an originator at 202. The scheduled event is initiated to generate collaborative content associated with the scheduled event. The collaborative content may include, for example, a request for one or more recipients to attend one or more scheduled events.

The originator designates that specified triggering events associated with the scheduled event are to be tracked, and those designations are received, e.g., by a collaborative process server at 204, e.g., as described in greater detail herein. By way of illustration and not limitation, the triggering events may comprise one or more of deleting the scheduled event from the recipient's electronic calendar system, overriding the tracking of events associated with the shared collaborative content, flagging or otherwise assigning the scheduled event for a subsequent action or follow-up, accepting the scheduled event, declining the scheduled event, accepting a conflicting scheduled event, or sharing, forwarding, etc. the scheduled event that includes the shared collaborative content. The triggering event may also include other manipulations of the scheduled event, such as copying the content into another software application, such as a word processor, spreadsheet, etc.

Sharing the scheduled event that includes the shared collaborative content may comprise, for example, generating the scheduled event that includes the shared collaborative content on the shared electronic calendar of one or more new recipients. The originator may use the collaborative process software 112 to specify which types of events are to be detected, and may also specify which of the recipients to track the events thereof.

The originator may use the collaborative process software 112 to specify conditions associated with the propagation of notifications, which are received, e.g., by the collaborative process server at 206 as described more fully herein. By way of illustration and not limitation, the originator may use the propagation rules 120 to specify a constraint to the number of hints received over a given period of time when events associated with the tracked collaborative process are detected. Further, the originator may specify, using the propagation rules 120, that the originator will receive notifications only within a certain time period, e.g., only receive notifications for up to one month after scheduling the event, or only receive notifications within certain windows of time, e.g., once one week has elapsed after scheduling the event, only during business hours, etc.

The propagation rules may also be utilized to set up routing of hints as described more fully herein. The various propagation rules 120 selected by the originator may be the same or different for each selected recipient.

The originator may use the collaborative process software 112 to specify conditions associated with the transformation associated with the propagated notifications, and such specifications are received at 208, e.g., at the collaborative process server, e.g., as described more fully herein. By way of illustration and not limitation, the originator may specify, using the transformation rules 122, that a visual display of a computer processing device is transformed upon the propagation of each notification. The originator may specify that the transformation of the display takes the form of, for example, a modification of data on the display of the originator's computer processing device, e.g., an icon associated with the calendar software application, e.g., a scheduled event icon in the originator's electronic calendar or a color change of the scheduled event icon in the originator's electronic calendar, or a new message that appears on the originator's computer processing device's display, etc. Still further, the hint may take different forms depending upon the detected triggering action. For example, if a recipient reassigns the scheduled event to another recipient, the hint, e.g., a displayed as an icon, may take a first color, visual appearance, location on the display, etc. Correspondingly, an action, such as deleting the scheduled event may take a different form, color, location, visual representation, etc.

A server computer is used to share the collaborative content associated with the created scheduled event with the one or more recipients specified by the originator at 210 in a manner analogous to that already described herein.

Upon receipt of the scheduled event that includes the shared collaborative content, the recipients are given notice that events associated with the scheduled event are to be tracked at 212. The recipients may optionally be given the option to override or accept the tracking of events associated with the shared collaborative content at 214.

If one or more of the recipients accept the tracking of events at 214, triggering events performed by the accepting recipients associated with the shared collaborative content are automatically detected at 216. The triggering events may be detected, for example, according to the event rules 118 that have been specified by the originator for that particular accepting recipient as noted in greater detail herein. That is, a triggering event is automatically detected if the conditions associated with a corresponding event rule 118, which has been specified by the originator for that particular recipient, are met.

Upon the detection of a triggering event corresponding to an event rule 118 by one of the accepting recipients, a notification of the occurrence of the event is propagated to the originator at 218. Details in connection with the propagation of the occurrence of the event are specified by the originator at 206, as discussed above.

A display on a computer processing device associated with the originator is transformed at 220. The transformation provides a visual indication of the notification to the originator, to alert the originator of the occurrence of the event. Details in connection with the transformation are discussed in greater detail herein.

Figure 6:
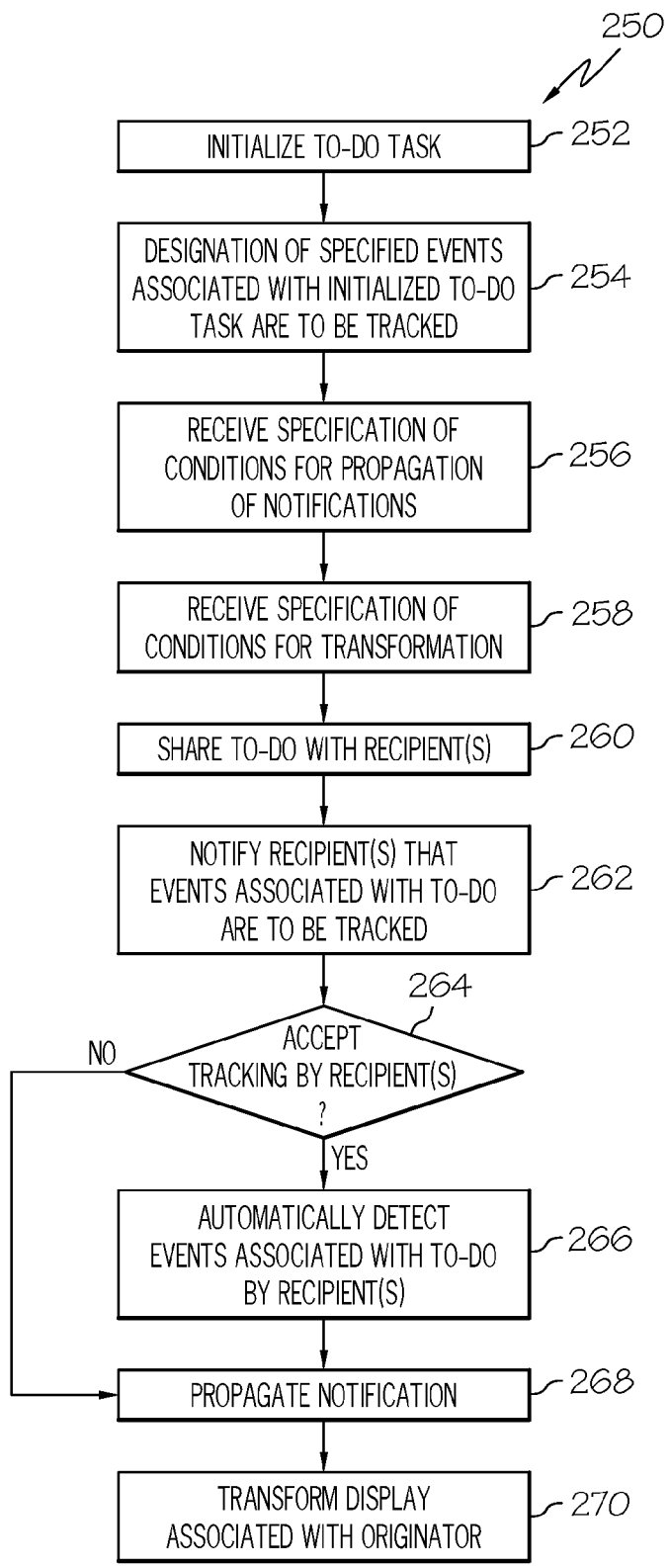
FIG. 6 is a flow chart of a computer-implemented method for electronically propagating notifications that are triggered by events associated with a tracked electronic to-do task according to various aspects of the present invention.

Referring now to FIG. 6, a flow chart 250 illustrating exemplary steps for carrying out yet another aspect of the invention is shown. In this example, a collaborative process is initiated by initializing a to-do task by an originator at 252. The initialized to-do task is initiated to generate collaborative content associated with the to-do task. The collaborative content may include, for example, a request for one or more recipients to perform one or more tasks.

The originator designates that specified triggering events associated with the initialized to-do task are to be tracked at 254, e.g., as described more fully herein. By way of illustration and not limitation, the triggering events may comprise one or more of deleting the initialized to-do task that includes the shared collaborative content, overriding the tracking of events associated with the shared collaborative content, flagging or otherwise assigning the initialized to-do task for a subsequent action or follow-up, accepting the initialized to-do task, declining the initialized to-do task, or sharing, forwarding, etc. the to-do task that includes the shared collaborative content. The triggering event may also include other manipulations of the initialized to-do task, such as copying the content into another software application, such as a word processor, spreadsheet, etc.

Sharing the initialized to-do task that includes the shared collaborative content may comprise, for example, re-assigning the initialized to-do task that includes the shared collaborative content to one or more sub-recipients, etc. The sub-recipients may be original recipients of the initialized to-do task that includes the shared collaborative content from the originator, or may not be original recipients of the initialized to-do task that includes the shared collaborative content from the originator. The originator may use the collaborative process software 112 to specify which types of events are to be detected, and may also specify which of the recipients to track the events thereof. For example, the originator may wish to receive notifications that one or more of the recipients re-assigned the initialized to-do task that includes the shared collaborative content to a sub-recipient, but may not wish to receive notification if one or more of the recipients' forwards the initialized to-do task to a group.

The originator may use the collaborative process software 112 to specify conditions associated with the propagation of notifications, which are received, e.g., by the collaborative process server at 256, e.g., as described more fully herein.

The propagation rules may also be utilized to set up routing of hints as described more fully herein. The various propagation rules 120 selected by the originator may be the same or different for each selected recipient.

The originator may use the collaborative process software 112 to specify conditions associated with the transformation associated with the propagated notifications, and such specifications are received at 258, e.g., at the collaborative process server. The conditions associated with the transformation may be specified by the originator by selecting one or more transformation rules 122 to be implemented using the collaborative process software 112, e.g., as described more fully herein. By way of illustration and not limitation, the originator may specify, using the transformation rules 122, that a visual display of a computer processing device is transformed upon the propagation of each notification.

The originator may specify that the transformation of the display takes the form of, for example, a modification of data on the display of the originator's computer processing device, e.g., an icon associated with the to-do task software application, e.g., a to-do task icon in the originator's to-do task software application or a color change of the to-do task icon in the originator's to-do task software application, or a new message that appears on the originator's computer processing device's display, etc. Still further, the hint may take different forms depending upon the detected triggering action. For example, if a recipient reassigns the to-do task to another recipient, the hint, e.g., a displayed as an icon, may take a first color, visual appearance, location on the display, etc. Correspondingly, an action, such as deleting the to-do task may take a different form, color, location, visual representation, etc.

A server computer is used to share the collaborative content associated with the initialized to-do task with the one or more recipients specified by the originator at 260 in a manner analogous to that already described herein.

Upon receipt of the to-do task that includes the shared collaborative content, the recipients may be given notice that events associated with the to-do task are to be tracked at 262, and the recipients may optionally be given the option to override or accept the tracking of events associated with the shared collaborative content at 264, e.g., as described more fully herein.

If one or more of the recipients accept the tracking of events at 264, triggering events performed by the accepting recipients associated with the shared collaborative content are automatically detected at 266. The triggering events may be detected according to the event rules 118 that have been specified by the originator for that particular accepting recipient as noted in greater detail herein. That is, a triggering event may be automatically detected if the conditions associated with a corresponding event rule 118, which has been specified by the originator for that particular recipient, are met.

Upon the detection of a triggering event corresponding to an event rule 118 by one of the accepting recipients, a notification of the occurrence of the event is propagated to the originator at 268. Details in connection with the propagation of the occurrence of the event are specified by the originator at 256, as discussed above.

A display on a computer processing device associated with the originator is transformed at 270. The transformation provides a visual indication of the notification to the originator, to alert the originator of the occurrence of the event. Details in connection with the transformation are discussed in greater detail herein.

Figure 7:
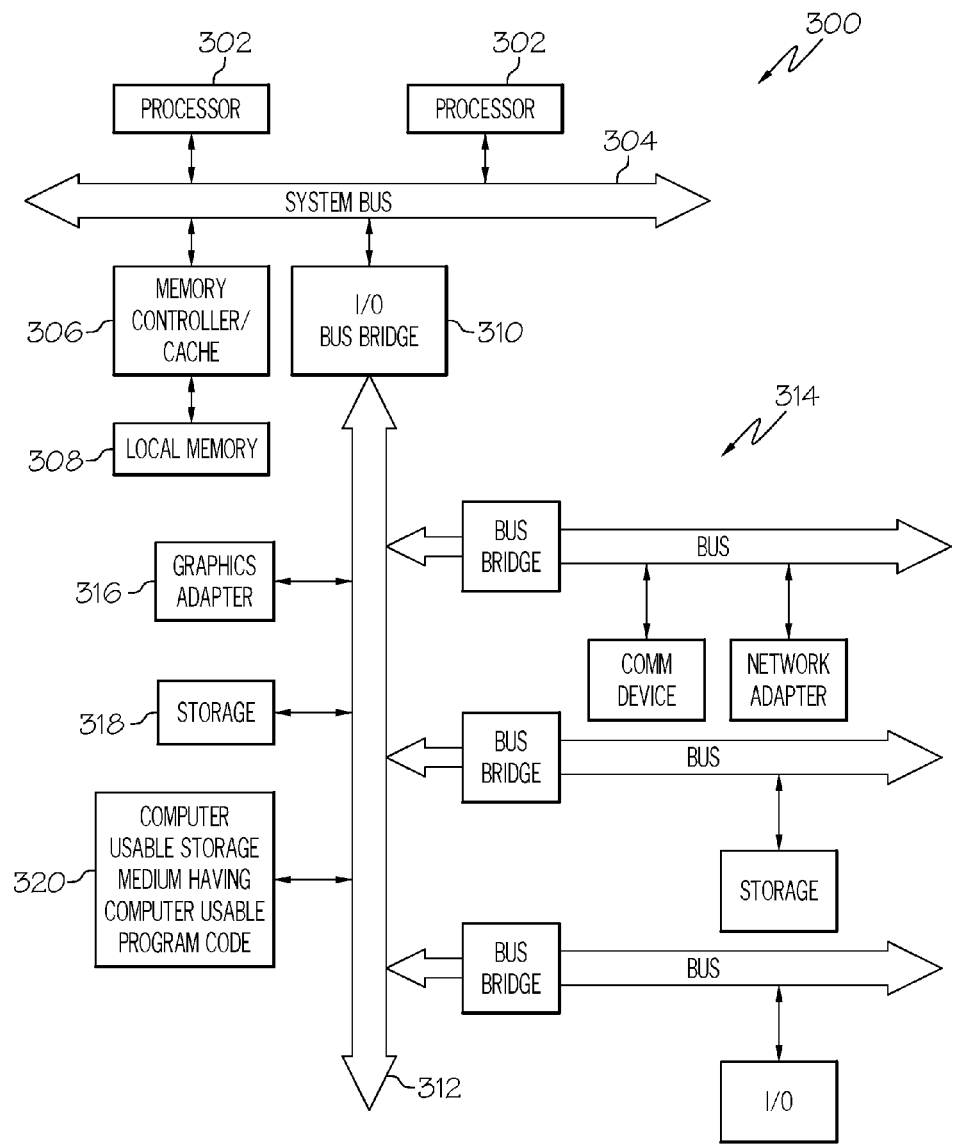
FIG. 7 is a block diagram of an exemplary computer system including a computer usable storage medium having computer usable program code embodied therewith, where the exemplary computer system is capable of executing a computer program product to provide event triggered hints or notifications for communications related to one or more tasks according to various aspects of the present invention.

Referring to FIG. 7, a block diagram of a data processing system is depicted in accordance with the present invention. Data processing system 300, such as one of the processing devices 102 or the collaborative process server 110 described with reference to FIG. 1, may comprise a symmetric multiprocessor (SMP) system or other configuration including a plurality of processors 302 connected to system bus 304. Alternatively, a single processor 302 may be employed. Also, connected to system bus 304 is memory controller/cache 306, which provides an interface to local memory 308. An I/O bus bridge 310 is connected to the system bus 204 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also, connected to the I/O bus may be devices such as a graphics adapter 316, storage 318 and a computer usable storage medium 320 having computer usable program code embodied thereon. The computer usable program code may be executed to execute any aspect of the present invention, for example, to implement any aspect of any of the methods and/or system components illustrated in FIGS. 1-6. Moreover, the computer usable program code may be utilized to implement the tracking of events, implement the graphical user interface or any other processes that are used to perform the tracking of events as set out further herein.

The data processing system depicted in FIG. 7 may be, for example, an IBM RS/6000 system, a product of International Business Machines Corporation in Armonk, N.Y., running the Advanced Interactive Executive (AIX) operating system. An object-oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

More specific examples of the computer readable storage medium comprise, for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object-oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a standalone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general-purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A computer program product, comprising:
a non-transitory computer readable storage medium having computer readable program code embodied therewith, the computer readable program code comprising:
   computer readable program code configured to implement a graphical user interface that, when executed on a processing device, graphically interacts with a user to identify electronically generated collaborative content of a corresponding computer-executed collaborative process that is to be tracked, wherein the user defines an originator of the identified electronically generated collaborative content;
   computer readable program code configured to implement a portion of the graphical user interface that graphically interacts with the originator of the identified electronically generated collaborative content to designate at least one event associated with the corresponding computer-executed collaborative process that triggers a notification to the originator of the identified electronically generated collaborative content;
   computer readable program code configured to implement a portion of the graphical user interface that communicates with a collaborative process server computer coupled to a network environment to identify the corresponding computer-executed collaborative process to be tracked and the designated at least one event associated with the corresponding computer-executed collaborative process to monitor;
   computer readable program code configured to share the identified electronically generated collaborative content with at least one recipient;
   computer readable program code configured to receive by the graphical user interface, an indication from the collaborative process server computer that the designated at least one event associated with the corresponding computer-executed collaborative process has occurred other than a communication from any recipient back to the originator; and
   computer readable program code configured to transform the graphical user interface to modify a visual display of the shared identified electronically generated collaborative content when the designated at least one event associated with the corresponding computer-executed collaborative process is detected so as to visually depict a notification of the occurrence of the designated at least one event associated with the corresponding computer-executed collaborative process to the originator.

2. The computer program product of claim 1, wherein the corresponding computer-executed collaborative process is integrated with the graphical user interface.

3. The computer program product of claim 1, wherein the designated at least one event associated with the corresponding computer-executed collaborative process is associated with any of the at least one recipient taking an action in a first collaborative process application that is different than the corresponding computer-executed collaborative process that is to be tracked.

4. The computer program product of claim 1, wherein the graphical user interface graphically interacts with the originator of the identified electronically generated collaborative content to designate at least one of:
   at least one propagation rule for propagating the notification of the occurrence of the designated at least one event associated with the corresponding computer-executed collaborative process to the originator; and
   at least one transformation rule for displaying on a computer processing device associated with the originator the visual depiction of the notification.

5. A computer-implemented method, comprising:
   providing, by a computer, a graphical user interface that graphically interacts with a user to identify electronically generated collaborative content of a corresponding computer-executed collaborative process that is to be tracked, wherein the user defines an originator of the identified electronically generated collaborative content;
   implementing, by the computer, a portion of the graphical user interface that graphically interacts with the originator of the identified electronically generated collaborative content to designate at least one event associated with the corresponding computer-executed collaborative process that triggers a notification to the originator of the identified electronically generated collaborative content;
   implementing, by the computer, a portion of the graphical user interface that communicates with a collaborative process server computer coupled to a network environment to identify the corresponding computer-executed collaborative process to be tracked and the designated at least one event associated with the corresponding computer-executed collaborative process to monitor;
   sharing, by the computer, the identified electronically generated collaborative content with at least one recipient;
   receiving, by the graphical user interface, an indication from the collaborative process server computer that the designated at least one event has occurred other than a communication from any recipient back to the originator; and
   transforming, by the computer, the graphical user interface to modify a visual display of the shared identified electronically generated collaborative content when the designated at least one event associated with the corresponding computer-executed collaborative process is detected so as to visually depict a notification of the occurrence of the designated at least one event associated with the corresponding computer-executed collaborative process to the originator.

6. The method of claim 5, comprising:
   integrating the corresponding computer-executed collaborative process with the graphical user interface.

7. The method of claim 5, wherein the indication comprises data related to the at least one recipient taking an action in a first collaborative process application that is different than the corresponding computer-executed collaborative process that is to be tracked.

8. The method of claim 5, wherein the graphical user interface graphically interacts with the originator of the identified electronically generated collaborative content to designate at least one of:
   at least one propagation rule for propagating the notification of the occurrence of the designated at least one event associated with the corresponding computer-executed collaborative process to the originator; and
   at least one transformation rule for displaying on the computer the visual depiction of the notification.

* * * * *